United States Patent
Moon

(10) Patent No.: US 7,103,019 B1
(45) Date of Patent: Sep. 5, 2006

(54) ERROR CORRECTION USING REDUNDANT PACKET STREAMS IN WIRELESS COMMUNICATIONS SYSTEMS

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 09/814,609

(22) Filed: Mar. 21, 2001

(51) Int. Cl.
    *H04Q 7/00* (2006.01)

(52) U.S. Cl. .................................. 370/328; 714/822

(58) Field of Classification Search ............... 370/390, 370/401, 476, 441, 477, 479; 375/262
    See application file for complete search history.

(56) References Cited

U.S. PATENT DOCUMENTS

| | | | | |
|---|---|---|---|---|
| 4,550,443 A | 10/1985 | Freeburg | ..................... | 455/33 |
| 4,937,817 A * | 6/1990 | Lin | ............................ | 370/416 |
| 5,355,367 A | 10/1994 | Comroe et al. | ............ | 370/95.1 |
| 5,410,732 A | 4/1995 | Ames et al. | ............... | 455/33.1 |
| 5,491,688 A | 2/1996 | Bocci et al. | .................. | 370/18 |
| 5,719,871 A | 2/1998 | Helm et al. | ................. | 370/479 |
| 5,794,149 A | 8/1998 | Hoo | ........................... | 455/438 |
| 5,850,607 A | 12/1998 | Muszynski | .................. | 455/442 |
| 5,867,491 A | 2/1999 | Derango et al. | ........... | 370/329 |
| 5,920,817 A | 7/1999 | Umeda et al. | .............. | 455/437 |
| 5,999,815 A | 12/1999 | TenBrook et al. | .......... | 455/436 |
| 6,038,452 A | 3/2000 | Strawczynski et al. | ..... | 455/446 |
| 6,044,270 A | 3/2000 | Raith | ........................ | 455/434 |
| 6,058,107 A | 5/2000 | Love et al. | ................. | 370/332 |
| 6,069,885 A | 5/2000 | Fong et al. | ................. | 370/336 |
| 6,151,502 A | 11/2000 | Padovani et al. | ............ | 455/442 |
| 6,222,830 B1 | 4/2001 | Padovani et al. | ........... | 370/332 |
| 6,233,454 B1 | 5/2001 | Sato | ........................... | 455/437 |
| 6,262,980 B1 | 7/2001 | Leung et al. | ............... | 370/336 |
| 6,263,204 B1 | 7/2001 | Kusaki et al. | .............. | 455/439 |
| 6,272,134 B1 * | 8/2001 | Bass et al. | .................. | 370/390 |
| 6,295,450 B1 | 9/2001 | Lyer et al. | .................. | 455/436 |
| 6,348,880 B1 | 2/2002 | Xu | .............................. | 341/50 |
| 6,359,877 B1 | 3/2002 | Rathonyi et al. | ........... | 370/349 |
| 6,442,401 B1 | 8/2002 | Behan | ......................... | 455/552 |
| 6,496,700 B1 | 12/2002 | Chawla | ...................... | 455/456 |
| 6,516,196 B1 | 2/2003 | Chen et al. | ................. | 455/450 |

(Continued)

OTHER PUBLICATIONS

U.S. Appl. No. 09/670,055, filed Sep. 25, 2000, entitled "*Packet Voting in Wireless Communications Systems,*" 39 total pages.

(Continued)

*Primary Examiner*—Chau Nguyen
*Assistant Examiner*—Chrsitopher Grey
(74) *Attorney, Agent, or Firm*—Baker Botts L.L.P.

(57) ABSTRACT

A communications system includes a mobile unit that transmits redundant content to a plurality of destinations. A copy of the content that is transmitted to each destination is encoded using a code that is related to the codes used to encode copies of the content transmitted to the other destinations. The system further includes a number of base transceiver stations. Each base transceiver station receives a copy of the coded content from the mobile unit, generates a packet including the coded content, and communicates the packet. Furthermore, the system includes a decoder that receives a number of packets that each include a copy of the coded content and that are each generated at a different base transceiver station. The decoder decodes the content in the packets by concatenating the related codes used to encode each copy of the content and generates one or more redundant packets including the decoded content.

34 Claims, 6 Drawing Sheets

U.S. PATENT DOCUMENTS

| | | | |
|---|---|---|---|
| 6,535,738 B1 | 3/2003 | Bomar et al. | 455/436 |
| 6,549,542 B1* | 4/2003 | Dong et al. | 370/441 |
| 6,570,871 B1* | 5/2003 | Schneider | 370/356 |
| 6,594,229 B1 | 7/2003 | Gregorat | 370/219 |
| 6,603,751 B1 | 8/2003 | Odenwalder | 370/331 |
| 6,611,513 B1* | 8/2003 | ten Brink | 370/342 |
| 6,628,632 B1 | 9/2003 | Dolan | 370/332 |
| 6,647,262 B1 | 11/2003 | Demetrescu et al. | 455/436 |
| 6,691,273 B1 | 2/2004 | Wagner et al. | 714/751 |
| 6,697,642 B1 | 2/2004 | Thomas | 455/562.1 |
| 6,728,296 B1 | 4/2004 | Yung | 375/141 |
| 6,785,254 B1* | 8/2004 | Korus et al. | 370/338 |
| 2001/0008522 A1 | 7/2001 | Padovani et al. | 370/332 |
| 2001/0034237 A1 | 10/2001 | Garahi | 455/456 |
| 2002/0027890 A1 | 3/2002 | Bernstein et al. | 370/331 |
| 2002/0058481 A1 | 5/2002 | Mohebbi | 455/67.1 |
| 2002/0075889 A1 | 6/2002 | Rong et al. | 370/429 |
| 2002/0095635 A1 | 7/2002 | Wager et al. | 714/746 |
| 2002/0110088 A1 | 8/2002 | Lundby et al. | 370/252 |
| 2002/0114332 A1 | 8/2002 | Apostolopoulos et al. | 370/392 |
| 2002/0118665 A1 | 8/2002 | Cleveland et al. | 370/342 |
| 2003/0195001 A1 | 10/2003 | Tari et al. | 455/435.2 |

OTHER PUBLICATIONS

U.S. Appl. No. 09/670,056, filed Sep. 25, 2000, entitled *"Packet Voting in Wireless Mobile Devices,"* 38 total pages.

U.S. Appl. No. 09/669,098, filed Sep. 25, 2000, entitled *"Generating Graded Packets for Packet Voting in Wireless Communications Systems,"* 36 total pages.

U.S. Appl. No. 09/814,356, filed Mar. 21, 2001, entitled *"Redundant Packet Selection and Manipulation in Wireless Communications Systems,"* 52 total pages.

U.S. Appl. No. 09/814,374, filed Mar. 21, 2001, entitled *"Improved Decoding Using Redundant Packet Selection Information in Wireless Communications Systems,"* 45 total pages.

U.S. Appl. No. 09/814,285, filed Mar. 21, 2001, entitled *"Redundant Packet Selection Based on Packet Content in Wireless Communications Systems,"* 46 total pages.

Van Nobelen, *"An Adaptive Radio Link Protocol with Enhanced Data Rates for GSM Evolution,"* IEEE Personal Communications, Feb. 1999, pp. 54-63.

\* cited by examiner

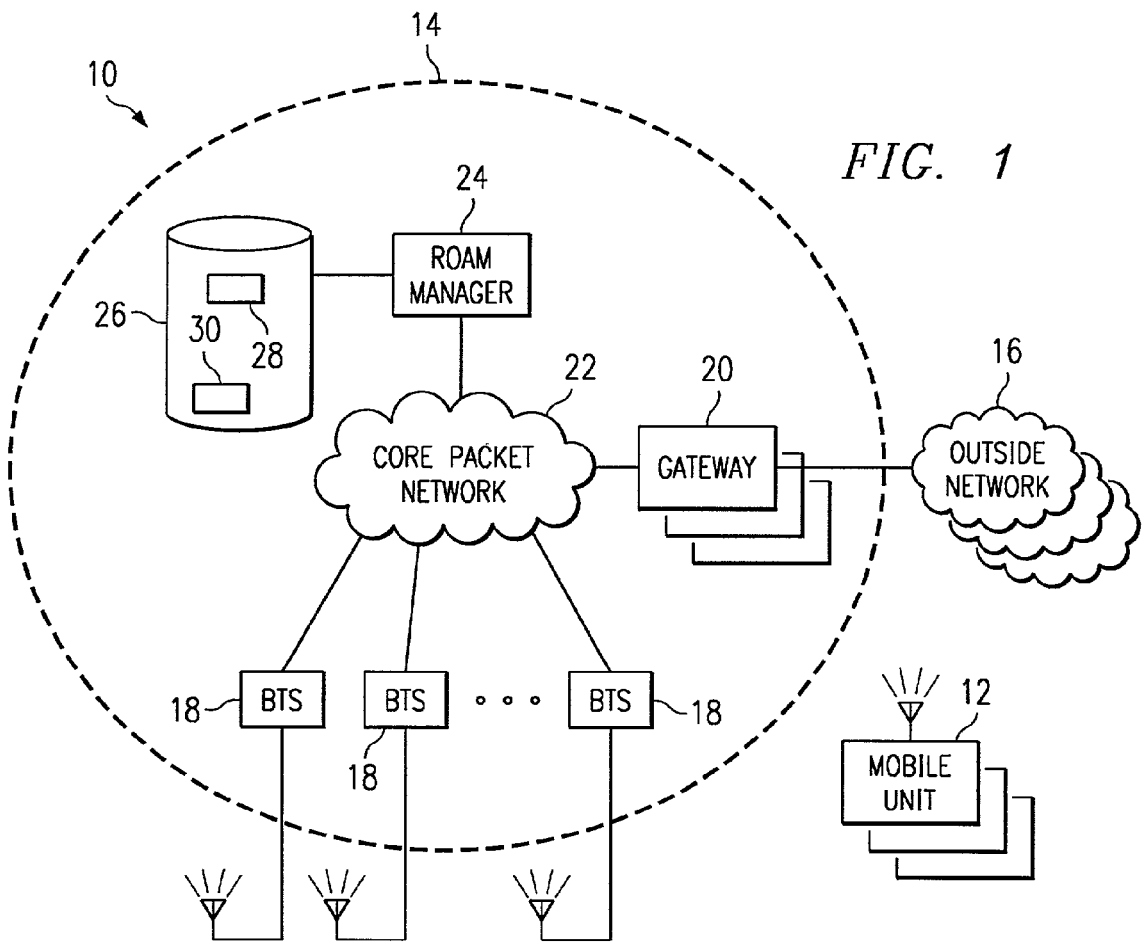

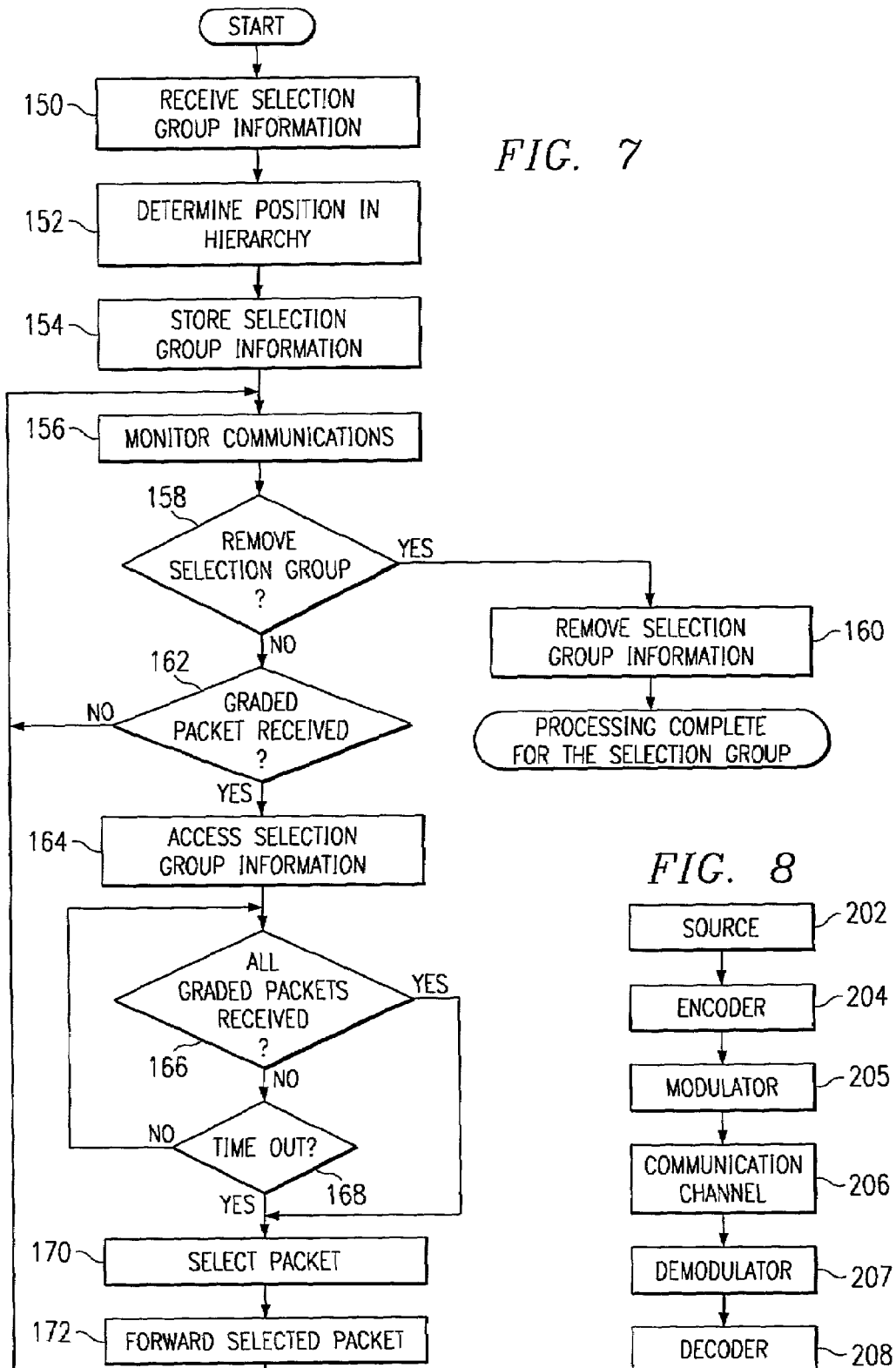

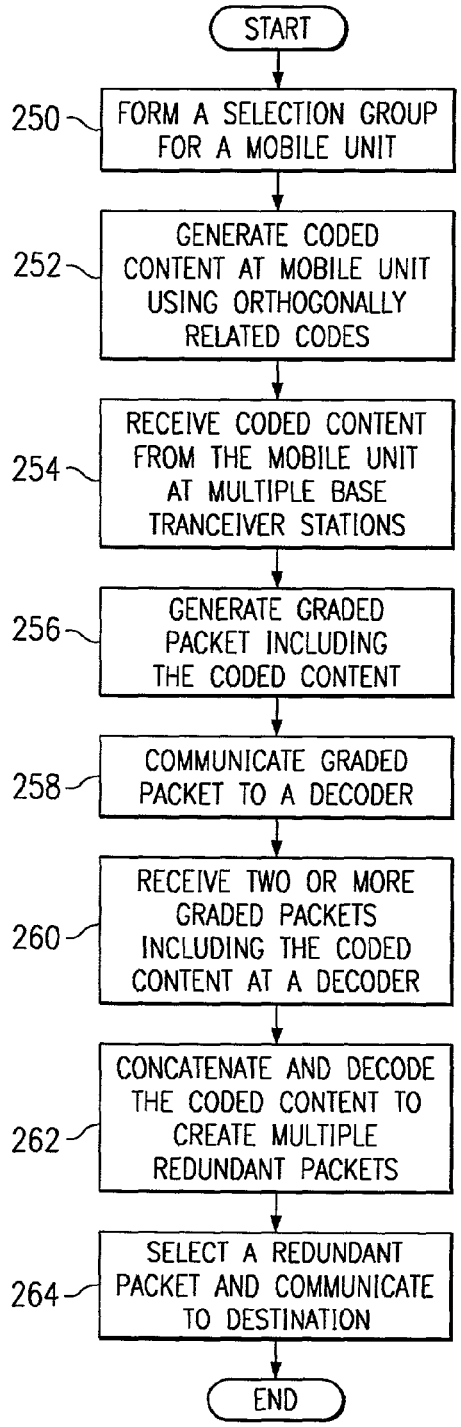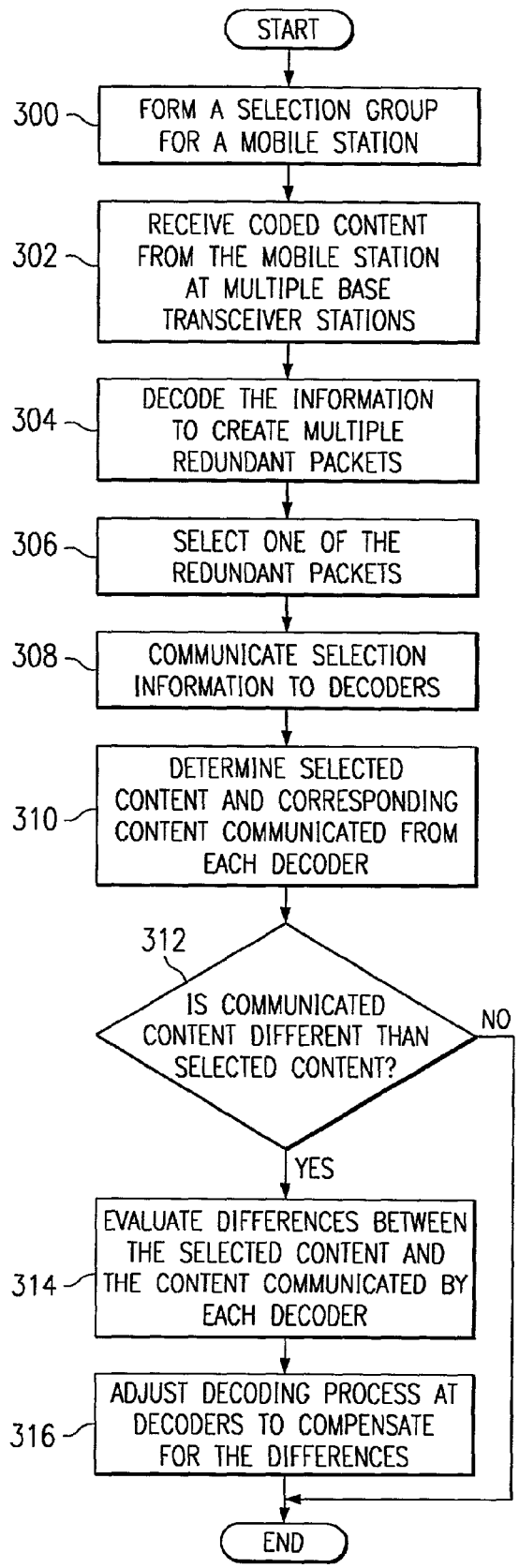

ERROR CORRECTION USING REDUNDANT PACKET STREAMS IN WIRELESS COMMUNICATIONS SYSTEMS

CROSS-REFERENCE TO RELATED APPLICATIONS

This application is related to U.S. application Ser. No. 09/814,356 entitled "Redundant Packet Selection and Manipulation in Wireless Communications Systems," which was filed on Mar. 21, 2001 by Billy G. Moon, U.S. application Ser. No. 09/814,374 entitled "Improved Decoding Using Redundant Packet Selection Information in Wireless Communications Systems," which was filed on Mar. 21, 2001 by Billy G. Moon, and U.S. application Ser. No. 09/814,285 entitled "Redundant Packet Selection Based on Packet Content in Wireless Communications Systems," which was filed on Mar. 21, 2001 by Billy G. Moon.

TECHNICAL FIELD OF THE INVENTION

The present invention relates generally to wireless communications and more particularly to error correction using redundant packet streams in wireless communications systems.

BACKGROUND OF THE INVENTION

Typical cellular systems include base transceiver stations that provide wireless communications for cellular phones. These base transceiver stations connect to base station controllers and transmit phone calls and other data using circuit-switched, time division multiplexed core network. The connections between base transceiver stations and base station controllers typically support multiple communications sessions by assigning each session to a particular time-slot within frames. Thus, multiple cell phones may simultaneously establish communications sessions via one base transceiver station, and the base transceiver station uses different time-slots for each session. The management and assignment of time-slots often requires complex algorithms making tradeoffs based on a variety of factors. As the number of cell phones increases in a given area, proper management of time-slots becomes critical.

The roaming of a cell phone between base transceiver stations during a communications session exacerbates problems in time-slot management. An established session roaming to a new base transceiver station typically requires a similar time-slot on both the original and the new base transceiver station. Therefore, time division multiplexed connections may result in inefficient use of bandwidth between base transceiver stations and base station controllers and introduces complexity to time-slot management and roaming decisions for cell phones.

SUMMARY OF THE INVENTION

In accordance with the present invention, techniques for error correction in wireless communications systems are provided which substantially eliminate or reduce disadvantages and problems associated with previous techniques.

According to one embodiment of the present invention, a communications system includes a mobile unit that transmits redundant content to a plurality of destinations. A copy of the content that is transmitted to each destination is encoded using a code that is related to the codes used to encode copies of the content transmitted to the other destinations. The system further includes a number of base transceiver stations. Each base transceiver station receives a copy of the coded content from the mobile unit, generates a packet including the coded content, and communicates the packet. Furthermore, the system includes a decoder that receives a number of packets that each include a copy of the coded content and that are each generated at a different base transceiver station. The decoder decodes the content in the packets by concatenating the related codes used to encode each copy of the content and generates one or more redundant packets including the decoded content.

The present invention provides a number of technical advantages. For example, embodiments of the present invention include a packet-switched core that replaces the circuit-switched core typically used by cellular systems. This packet-switched core enables more efficient use of resources and eliminates complexity associated with the management of time-slots. Embodiments of the present invention also implement packet voting procedures in the packet-switched core that enable more efficient roaming of mobile units between base transceiver stations. These procedures enable the packet-switched network to intelligently select between copies of packets from a mobile unit received by multiple base transceiver stations. Each base transceiver station may encode metrics within received packets to facilitate selection between multiple copies of a single packet. Furthermore, a hierarchical voting structure may be used to distribute selection decisions and to reduce the propagation of redundant packets.

The packet voting procedures of the present invention also enable the use of multiple redundant packet streams from a single mobile unit. These redundant packet streams may be used not only to improve roaming of mobile units but also to improve error correction of the content communicated from mobile units. One of these advantages associated with certain embodiments of the present invention includes the ability to concatenate error correction codes encoded in the redundant packet streams. This allows for high rate encoding to be used without increasing the bandwidth required to communicate encoded content from a mobile unit. Another advantage associated with certain embodiments of the present invention is the ability to provide information regarding which redundant packet was selected using the packet voting procedures to the network devices used to decode content received from a mobile unit. These network devices, such as base transceiver stations, can then use this feedback to improve the decoding of content that is subsequently received from the mobile unit. Other technical advantages of the present invention will be readily apparent to one skilled in the art from the following figures, descriptions and claims.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates an exemplary communications system having a core packet network supporting wireless communications with mobile units;

FIG. 2 illustrates an exemplary table maintaining exemplary information for determining candidate base transceiver stations for roaming from a primary base transceiver station;

FIG. 3 illustrates an exemplary table maintaining exemplary information for monitoring communications with a mobile unit and for selecting between candidate base transceiver stations during roaming;

FIG. 7 illustrates an exemplary method for participating in a packet voting selection group hierarchy;

FIG. 8 illustrates exemplary functional components of a communication system using forward error correction;

FIG. 9 illustrates an exemplary method of error correction using concatenated error codes from redundant packet streams; and FIG. 10 illustrates an exemplary method for improved error correction using redundant packet selection information.

DETAILED DESCRIPTION OF THE DRAWINGS

Figure 4:
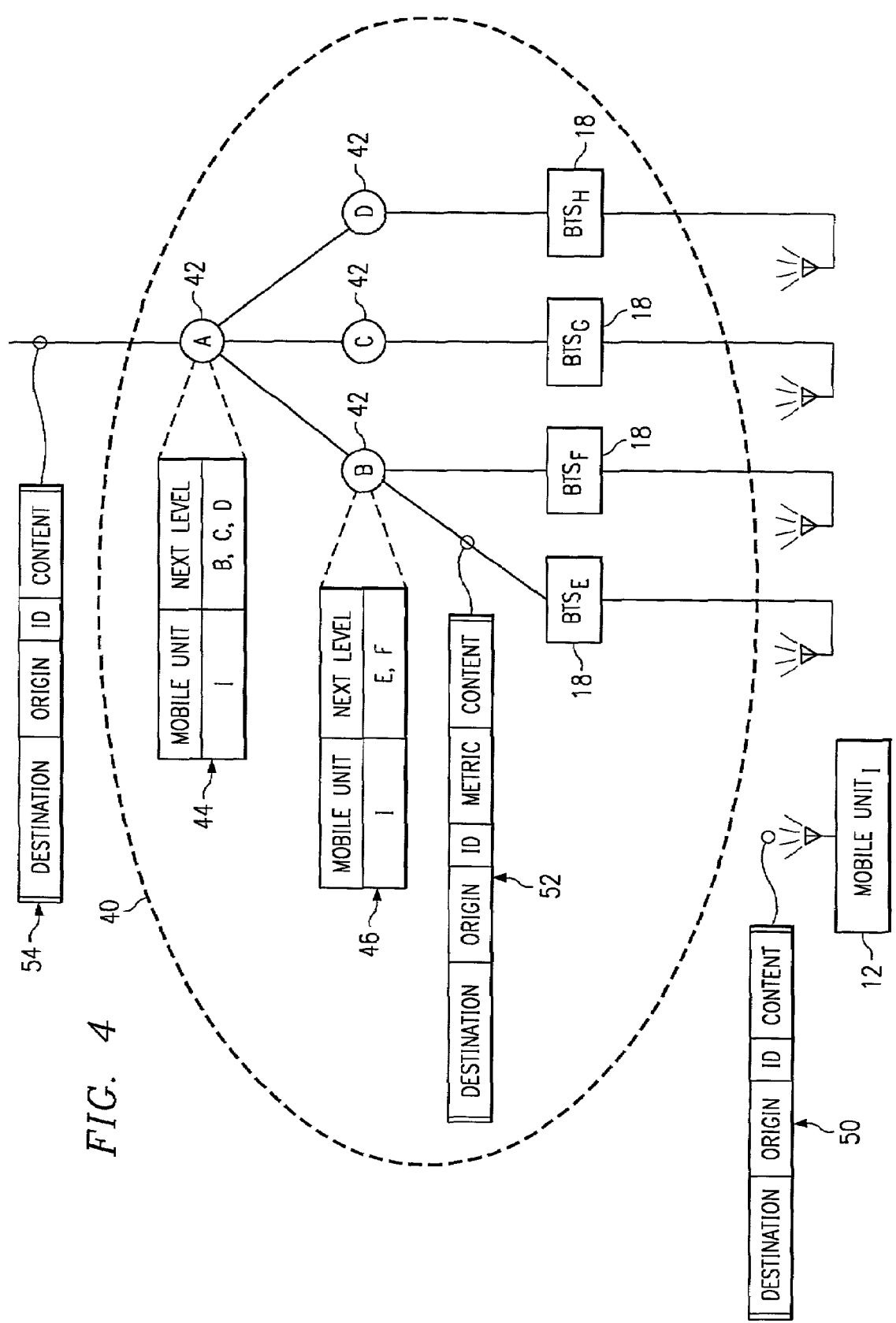
FIG. 4 illustrates an exemplary hierarchical selection group for communicating packets received from a mobile unit by multiple base transceiver stations.

FIG. 1 illustrates an exemplary communications system, indicated generally at 10, that includes mobile units 12 coupled via wireless links to a managed network 14 that may be coupled to outside networks 16. Managed network 14 includes base transceiver stations 18, gateways 20, a core packet network (CPN) 22, and a roam manager 24. In general, mobile unit 12 establishes a wireless link with one or more transceiver stations 18 to communicate with other mobile units 12 or with devices coupled to outside networks 16. Managed network 14 supports packet voting between multiple copies of each packet received from mobile unit 12. More specifically, CPN 22 may select between copies of a packet received from mobile unit 12 by multiple transceiver stations 18, and gateway 20 may forward a selected one of the copies to an appropriate outside network 16.

Mobile units 12 provide wireless communications using any suitable wireless communications protocol and may establish wireless links with transceiver stations 18 in managed network 14. For example, mobile units 12 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information via any suitable wireless communications protocols. Managed network 14 represents any collection and arrangement of components each aware of the topology within managed network 14. That is, each component of managed network 14 may access information describing the network layout for other components of managed network 14. This information may include network addresses, routing tables, or other suitable information. Thus, for example, if managed network implements Internet Protocol (IP) communications, each component of managed network 14 may be aware of the IP addresses for other components in managed network 14.

Transceiver stations 18 represent hardware and/or software supporting wireless links with mobile units 12 using any suitable wireless communications protocol. Transceiver stations 18 receive information from mobile units 12 in packets or receive information from mobile units 12 and packetize the information for packet-switched communication via CPN 22. CPN 22 represents any collection and arrangement of hardware and/or software providing packet-switched communications between transceiver stations 18, gateways 20, and roam managers 24. For example, CPN 22 may include routers, bridges, gateways, switches, or other suitable network equipment providing packet-switched communications.

Gateways 20 represent hardware and/or software linking managed network 14 to outside networks 16, such as mobile switching centers (MSCs), network gateways, or other suitable equipment. For example, gateways 20 may link to the public switched telephone network (PSTN), a global computer network such as the Internet, local area networks (LANs), wide area networks (WANs), or other communications networks. Moreover, gateways 20 may support conversions between the packet-switched communications supported by CPN 22 and protocols used by outside networks 16. For example, gateway 20 may communicate information with CPN 22 using packet-switched protocols while providing circuit-switched communications with selected outside networks 16.

Roam manager 24 represents hardware and/or software that monitors, manages and controls wireless links between mobile units 12 and transceiver stations 18. As part of this management and control, roam manager 24 facilitates the roaming of mobile units 12 between transceiver stations 18. Roaming refers to any activities supporting communications between mobile unit 12 and multiple transceiver stations 18 or supporting movement of mobile units 12 between areas serviced by different transceiver stations 18 or other wireless services equipment. Therefore, roam manager 24 supports management and control of links between mobile units 12 and transceiver stations 18 to provide substantially uninterrupted wireless services. While roam manager 24 is illustrated as a separate component of managed network 14, system 10 contemplates incorporating the functionalities of roam manager 24 into any suitable components. For example, devices in CPN 22, gateways 20, transceiver stations 18, mobile units 12 and/or other suitable equipment may provide some or all of the functions of roam manager 24. Moreover, any of the functionalities of roam manager 24 may be separated and distributed among components of system 10 and may be implemented using any suitable combination of hardware and/or software.

To facilitate management and control of roaming of mobile units 12, roam manager 24 may access information stored in a memory 26. Memory 26 represents any one or combination of volatile or non-volatile, local or remote devices suitable for storing data, for example, random access memory (RAM) devices, read only memory (ROM) devices, magnetic storage devices, optical storage devices, or any other suitable data storage devices. In a particular embodiment, memory 26 stores a candidate table 28 and a link table 30. Candidate table 28 maintains information for selecting candidate transceiver stations 18 for roaming from an original transceiver station 18, and link table 30 maintains information for monitoring wireless links between transceiver stations 18 and mobile units 12.

In operation, mobile unit 12 establishes a communications session with a remote location via a wireless link with a selected transceiver station 18 in managed network 14. The communications session may use any suitable connection-oriented or connection-less, synchronous or asynchronous protocols. Establishing the session may result from mobile unit 12 initiating a telephone call, receiving a telephone call, establishing a data session, transmitting or receiving a page, roaming into an area, or any other suitable event. Transceiver station 18 monitors the wireless link and communicates information describing the link to roam manager 24.

These communications include any information describing the link, such as signal strength, bit error rate (BER), carrier-to-noise ratio (CNR), signal-to-noise ratio (SNR), or other suitable metrics. Roam manager 24 may maintain this information using link table 30. During the communications session, CPN 22 routes packets associated with the session to an appropriate gateway 20. However, if the remote location is serviced by a selected transceiver station 18 in managed network 14, then CPN 22 may stream packets between transceiver station 18 communicating with mobile unit 12 and transceiver station 18 communicating with the remote location.

Roam manager 24 monitors the link based on information received from transceiver station 18 and, if an appropriate trigger occurs, initiates roaming of mobile unit 12. For example, transceiver station 18 may report signal strength to roam manager 24, and, when the signal strength drops below a threshold, roam manager 24 initiates roaming of mobile unit 12. Given an appropriate triggering event, roam manager 24 determines candidate transceiver stations 18 for roaming. Candidate transceiver stations 18 include potential stations for establishing a new wireless link with mobile unit 12. Roam manager 24 may determine candidate transceiver stations 18 based on the original transceiver station 18, for example, by determining transceiver stations 18 in areas adjacent to the original transceiver station 18. In a particular embodiment, roam manager 24 accesses candidate table 28 to determine candidate transceiver stations 18 based on the original transceiver station 18. However, system 10 contemplates roam manager 24 using any suitable techniques or information for determining candidate transceiver stations 18 for roaming.

After determining candidate transceiver stations 18, roam manager 24 directs the establishment of links between candidate transceiver stations 18 and mobile unit 12. This may include instructing candidate transceiver stations 18 to communicate with mobile unit 12 using appropriate protocols and similarly instructing mobile unit 12 to communicate with candidate transceiver stations 18. For example, consider mobile unit 12 roaming in a system using Walsh code/frequency combinations (typical of code division multiple access (CDMA) systems) for wireless links between mobile unit 12 and transceiver stations 18. To set up links between mobile unit 12 and multiple candidate transceiver stations 18, roam manager 24 may instruct candidate transceiver stations 18 to send outbound packets to mobile unit 12 using particular Walsh code/frequency combinations and to receive inbound packets from mobile unit 12 using a separate Walsh code/frequency combination. In addition, roam manager 24 may instruct mobile unit 12 to receive packets from candidate transceiver stations 18 using the specified Walsh code/frequency combinations. This establishes multiple, parallel, wireless links between mobile unit 12 and transceiver stations 18. Therefore, each candidate transceiver station 18 and the original transceiver station 18 may receive a copy of each packet transmitted by mobile unit 12, and mobile unit 12 may receive packets from each candidate transceiver station 18 and the original transceiver station 18. While this example focuses on specific protocols, system 10 contemplates mobile units 12 and transceiver stations 18 establishing wireless links using any suitable communications protocols. Moreover, while this example includes mobile unit 12 establishing a single link and then roaming between a group of transceiver stations 18, system 10 contemplates mobile unit 12 continuously roaming between multiple transceiver stations 18.

In addition to directing communications between transceiver stations 18 and mobile unit 12, roam manager 24 may also establish a selection group associated with the communications session to aid in streaming multiple copies of inbound and outbound packets through managed network 14. For example, managed network 14 may use the selection group to select from multiple copies of each inbound packet received from mobile unit 12 and to distribute copies of each outbound packet to transceiver stations 18 communicating with mobile unit 12. To establish the selection group, roam manager 24 may include the original transceiver station 18 providing a wireless link to mobile unit 12 and candidate transceiver stations 18.

After determining transceiver stations 18 in the selection group, roam manager 24 propagates this selection group information to devices in managed network 14, including components of CPN 22. This propagation establishes a hierarchy for selecting between multiple copies of each packet received by transceiver stations 18 in the selection group. As previously discussed, during roaming of mobile unit 12, each transceiver station 18 in the selection group receives a copy of each packet transmitted by mobile unit 12. The selection group hierarchy provides a mechanism for selecting one of the copies of each packet transmitted by mobile unit 12 to communicate to the remote location.

In addition, devices in managed network 14 may use this selection group hierarchy to control the distribution of outbound packets (packets from the remote location to mobile unit 12). For example, the selection group hierarchy may fan out a single packet from the remote location, resulting in each transceiver station 18 in the selection group receiving a copy of the packet. Each transceiver station 18 in the selection group then transmits its copy of the packet to mobile unit 12, allowing mobile unit 12 to select the best available packet or otherwise combine or select from multiple copies of each packet received. Therefore, managed network 14 may use the selection group to aid in distribution of copies of outbound packets and to enable hierarchical packet voting resulting in a single copy of each inbound packet reaching the remote location.

To aid in this packet voting, components in system 10 encode metrics or other information in each inbound packet to enable selection between multiple copies of each inbound packet. In a particular embodiment, transceiver stations 18 determine a metric associated with each packet received from mobile unit 12 and generate a graded packet encoding this metric and the contents of the original packet. Transceiver stations 18 generate graded packets using any metric or metrics, such as signal strength, BER, CNR, SNR, or other suitable metrics. Thus, components in managed network 14 differentiate between copies of each packet based on the metrics or other information encoded in the graded packets. This allows a component receiving multiple copies of a packet, as graded packets, to intelligently select one or more of the graded packets to forward.

For example, consider mobile unit 12 communicating with two transceiver stations 18 of a selection group. Each transceiver station 18 receives a copy of an inbound packet, determines a metric associated with the wireless link to mobile unit 12, generates a graded packet encoding this metric and the inbound packet, and forwards the graded packet to CPN 22. An element of CPN 22 (or gateway 20) receives the two graded packets, selects one of the packets based on the encoded metrics, and then forwards the selected packet. Thus, managed network 14 votes between multiple copies of a packet based on encoded metrics. System 10 contemplates using any suitable metrics or techniques for selecting between multiple copies of a packet. Furthermore, while these examples focus on wireless communications applications, similar techniques and methods may be used for other applications that may benefit from packet voting, such as conferencing or collaboration over wireless or wireline networks.

During roaming, roam manager 24 may also monitor wireless links between roaming mobile units 12 and transceiver stations 18 to determine when to terminate roaming and remove selection groups. In a particular embodiment, transceiver stations 18 monitor wireless links with mobile units 12, generate monitoring information, and communicate monitoring information to roam manager 24. For example, each transceiver station 18 continuously, periodically, or sporadically communicates values for metrics measuring characteristics associated with wireless links between that transceiver station 18 and mobile units 12. Monitoring information may include any suitable metrics, such as signal strength, BER, CNR, and SNR. Memory 26 may store monitoring information in link table 30. Based on this and/or other information, roam manager 24 determines when to terminate roaming and remove selection groups for mobile units 12. For example, roam manager 24 may monitor each wireless link for mobile unit 12 communicating with multiple transceiver stations 18. When one of the links meets certain criteria, roam manger 24 may terminate roaming and remove the selection group associated with that mobile unit 12, allowing mobile unit 12 to continue wireless communications with a selected primary transceiver station 18.

System 10 contemplates roam manager 24 using any suitable techniques and information for determining when to terminate roaming of mobile units 12 and to remove selections groups. Moreover, roam manager 24 may support "soft" roaming of mobile units 12. In soft roaming, roam manager 24 adds and removes transceiver stations 18 from the selection group at any time without terminating the selection group. Thus, roam manager 24 may continuously maintain a selection group for mobile unit 12, modifying the membership of the group as appropriate.

To terminate roaming, roam manager 24 suspends communications between mobile unit 12 and transceiver stations 18 in the selection group not selected as the primary transceiver station 18. In a particular embodiment, roam manager 24 instructs the non-primary transceiver stations 18 to stop communicating outbound packets to mobile unit 12 and to stop receiving inbound packets from mobile unit 12, and roam manager 24 instructs mobile unit 12 to stop receiving packets from the non-primary transceiver stations 18. This results in a single wireless link between mobile unit 12 and primary transceiver station 18. In addition to terminating roaming, roam manager 24 may also remove the selection group associated with mobile unit 12. For example, roam manager 24 issues a command to elements in managed network 14 requesting all elements to stop streaming packets according to the selection group. As a result, managed network 14 discontinues packet voting according to the selection group hierarchy and discontinues copying of outbound packets to multiple transceiver stations 18. While the preceding examples illustrate particular embodiments, system 10 contemplates roam manager 24 using any appropriate techniques for terminating roaming of mobile units 12 and for removing selection groups.

Moreover, managed network 14 may implement soft roaming using dynamic selection groups and, as previously discussed, may distribute selection group and roaming management among components in system 10. For example, each transceiver station 18 may monitor signals from mobile units 12, such as communications control signals, to determine mobile units 12 within an effective range of that transceiver station 18. This includes, for example, transceiver station 18 determining all mobile units 12 that have a signal strength that exceeds a threshold. Based on these determinations, each transceiver station 18 registers with selection groups for mobile units 12 within range and drop from selection groups for mobile units 12 that have moved out of range. Furthermore, mobile units 12 may monitor signals and add or remove transceiver stations 18 from selection groups. This provides selection groups that dynamically add and remove members based on distributed management. However, system 10 contemplates managed network 14 using any distribution or centralization of roaming and selection group management functions.

FIG. 2 illustrates an exemplary candidate table 28 maintained by memory 26. Candidate table 28 includes entries for candidate transceiver stations 18 indexed according to a primary transceiver station 18. Elements in system 10, such as roam manager 24, may use information in candidate table 28 to aid in managing and controlling roaming of mobile units 12 and in establishing selection groups. This exemplary candidate table 28 lists candidate transceiver stations 18 for two primary transceiver stations 18, stations E and F. For example, consider mobile unit 12 participating in a communication session using a wireless link with station E. Roam manager 24, monitoring this link, may determine that mobile unit 12 should roam between transceiver stations 18. Roam manager 24 accesses candidate table 28 and determines that mobile units 12 roaming from station E potentially roam to stations F, G, or H. Based on this determination, roam manager 24 establishes a selection group including stations E, F, G, and H and initiates roaming of mobile unit 12. Candidate table 28 illustrates only a particular embodiment for maintaining candidate information. System 10 contemplates using any suitable information maintained in any appropriate form for assisting with roaming decisions.

FIG. 3 illustrates an exemplary link table 30 maintained by memory 26. Roam manager 24 may access link table 30 to determine appropriate times for initiating and terminating roaming of mobile units 12. For each mobile unit 12 monitored by roam manager 24, link table 30 maintains monitoring information for wireless links between transceiver stations 18 and mobile units 12. This information includes any suitable metrics, reports, or other data, such as signal strength, BER, CNR, SNR, or other suitable information. This exemplary link table 30 illustrates link information for two mobile units 12, mobile units I and K. For example, link table 28 indicates that mobile unit I is currently communicating with stations E, F, G, and H. These transceiver stations 18 may represent members of a selection group established by roam manager 24 to facilitate roaming of mobile unit I. Table 30 also indicates that mobile unit K is currently communicating with station F. Thus mobile unit K, in this example, is not currently roaming. While this example includes specific metrics monitored by roam manager 24, system 10 contemplates roam manager 24 monitoring and link table 30 maintaining any suitable metrics for determining characteristics of wireless links between mobile units 12 and transceiver stations 18.

FIG. 4 illustrates an exemplary selection group hierarchy 40 established within managed network 14 that includes routers 42 and transceiver stations 18 for a selection group associated with mobile unit 12. Hierarchy 40 illustrates the operation of components in managed network 14 in accordance with an exemplary selection group hierarchy. In general, elements in hierarchy 40 may stream inbound and outbound packets associated with a communications session according to a selection group established for mobile unit 12. Routers 42 select between copies of inbound packets at each juncture, and thus hierarchy 40 may ultimately forward a single copy of each inbound packet from mobile unit 12. Hierarchy 40 may also generate multiple copies of outbound packets such that each transceiver station 18 receives copies of each outbound packet destined to mobile unit 12.

Routers 42 represent hardware and/or software components in managed network 14 that receive and forward packets and select between multiple copies of packets. For example, routers may be gateways 20, elements of CPN 22, or other suitable devices. Routers 42 may include an interface for communicating with other elements in system 10 and a processor for controlling the operation of router 42. These components may be implemented using any suitable combination or separation of modules using hardware and/or software components.

This illustration includes exemplary network addresses for each element. Thus, routers 42 have network addresses A, B, C, and D, transceiver stations 18 have network addresses E, F, G, and H, and mobile unit 12 has a network address of I. In addition, this example includes selection group information for various routers 42 illustrated as a first selection table 44 (maintained by router A) and a second selection table 46 (maintained by router B). Tables 44 and 46 each identify a mobile unit 12 associated with the selection group (mobile unit I) and network addresses for devices in the next lower level of hierarchy 40. For each inbound packet, routers 42 select from copies of the packet received from each device on the next lower level. For example, router A selects between copies of inbound packets received from routers B, C, and D. Similarly, router B selects between copies of packets received from stations E and F. Some elements of hierarchy 40, such as routers C and D, may simply forward packets without selecting between multiple copies.

Consider an inbound packet 50 transmitted by mobile unit I. In this example, packet 50 includes an origin, destination, identifier (ID), and content. The identifier may include a sequence number or other information for identifying the packet. Stations E, F, G, and H each receive a copy of packet 50, determine a metric associated with the wireless communications link with mobile unit I, generate a graded packet encoding the metric and information from the original inbound packet, and then forward the graded packet up hierarchy 40. For example, station E receives packet 50, determines a metric associated with communications between station E and mobile unit I, generates a graded packet 52 encoding this metric and information from the inbound packet, and forwards graded packet 52 to router B. Therefore, in this example, graded packet 52 includes the origin, destination, ID, and content of packet 50 as well as an encoded metric. Station F performs similar functions upon receiving the inbound packet. Routers 42 determine the group of graded packets from which to select based on the identifiers encoded in the packets. This group of graded packets may be referred to as "redundant" packets. However, it should be understood that due to transmission or other errors, redundant packets may not be identical when received by a router 42 or other appropriate device (thus the need for packet selection).

Router B receives graded packets from stations E and F, selects one of these packets based on the encoded metrics, and forwards the selected graded packet to router A. Routers C and D simply forward graded packets received from stations G and H to router A. At the final selection point, router A receives graded packets from routers B, C, and D, selects between these graded packets based on the encoded metrics, and forwards a selected packet 54. Therefore, hierarchy 40 may support a distributed selection process that allows mobile unit 12 to communicate with multiple transceiver stations 18 and provides intelligent selection between redundant packets received using multiple wireless links.

Using these techniques, hierarchy 40 may select the copy of each inbound packet with the highest potential for quality. For example, transceiver stations 18 may grade packets based on a signal strength associated with communications with mobile unit 12 while receiving the packet. Hierarchy 40 may then select between redundant packets based on signal strength and, for each inbound packet, forward the copy received on the wireless link having the highest signal strength for copies of that packet. In addition, hierarchy 40 may remove any metrics from the final packet selected. For example, router A may remove any metrics from the final selected packet, thus forwarding a single packet identical to the original packet transmitted by mobile unit I. Hierarchy 40 illustrates this, having selected packet 54 identical to packet 50 transmitted by mobile unit I.

While this example illustrates specific network elements and techniques for selecting between packets from multiple transceiver stations 18, system 10 contemplates using any suitable methods and criteria for selecting between multiple copies of a single packet (redundant packets). Moreover, these selection techniques may be used in any system requiring selection between copies of packets. For example, similar selection techniques may be used to establish multiple parallel paths for communications between two points or to facilitate conferencing functions.

Also, while this example focuses on packet-based communication between transceiver station 18 and mobile unit 12, system 10 contemplates wireless communications taking place using any appropriate techniques. Thus transceiver station 18 may receive information from mobile units 12 using any suitable protocols and then generate graded packets encoding the information and associated metrics. This information may include digital data, packets, voice information, control signals, video, telemetry data, and/or other suitable information. In addition, selection information, such as tables 44 and 46, may be maintained in any suitable form enabling centralized or distributed management of selection group information. Furthermore, as is described in further detail below, routers 42 may selectively combine information from one or more packets to create one or more new packets.

For outbound communications, managed network 14 may use hierarchy 40 to distribute copies of outbound packets to each transceiver station 18 communicating with mobile unit 12. For example, consider a single outbound packet for transmission to mobile unit I received by router A. Router A accesses selection group information, such as information stored in first table 44, determines that routers B, C, and D are in the next level of hierarchy 40, and forwards copies of the outbound packet to these routers 42. Similarly, routers B, C, and D each access selection group information and, based on this information, forward copies of the outbound packet to appropriate recipients. Thus, for this example, router B forwards copies of the outbound packet to stations E and F, router C forwards the outbound packet to station G, and router D forwards the outbound packet to station H. Thus, stations E, F, G, and H may each communicate a copy of the outbound packet to mobile unit I.

Therefore, when roaming, mobile unit I may receive a copy of each outbound packet from multiple transceiver stations 18. As previously discussed, mobile unit I may then select between the copies of each packet using any suitable selection criteria. For example, mobile unit I may select between copies based on signal strengths of wireless links with transceiver stations 18. Moreover, mobile unit I may combine information from each copy of a packet received to construct a more accurate packet than any of the individual copies. However, system 10 contemplates mobile units 12 using any suitable techniques and criteria to select between and/or combine multiple copies of received packets.

In addition, while this example illustrates managed network 14 using hierarchy 40 to distribute copies of outbound packets, system 10 contemplates using any suitable techniques or information to facilitate the distribution of copies of outbound packets to multiple transceiver stations 18. For example, managed network 14 may use different information, hierarchies, techniques, or groups to distribute outbound packets than are used for selecting between inbound packets.

Figure 5:
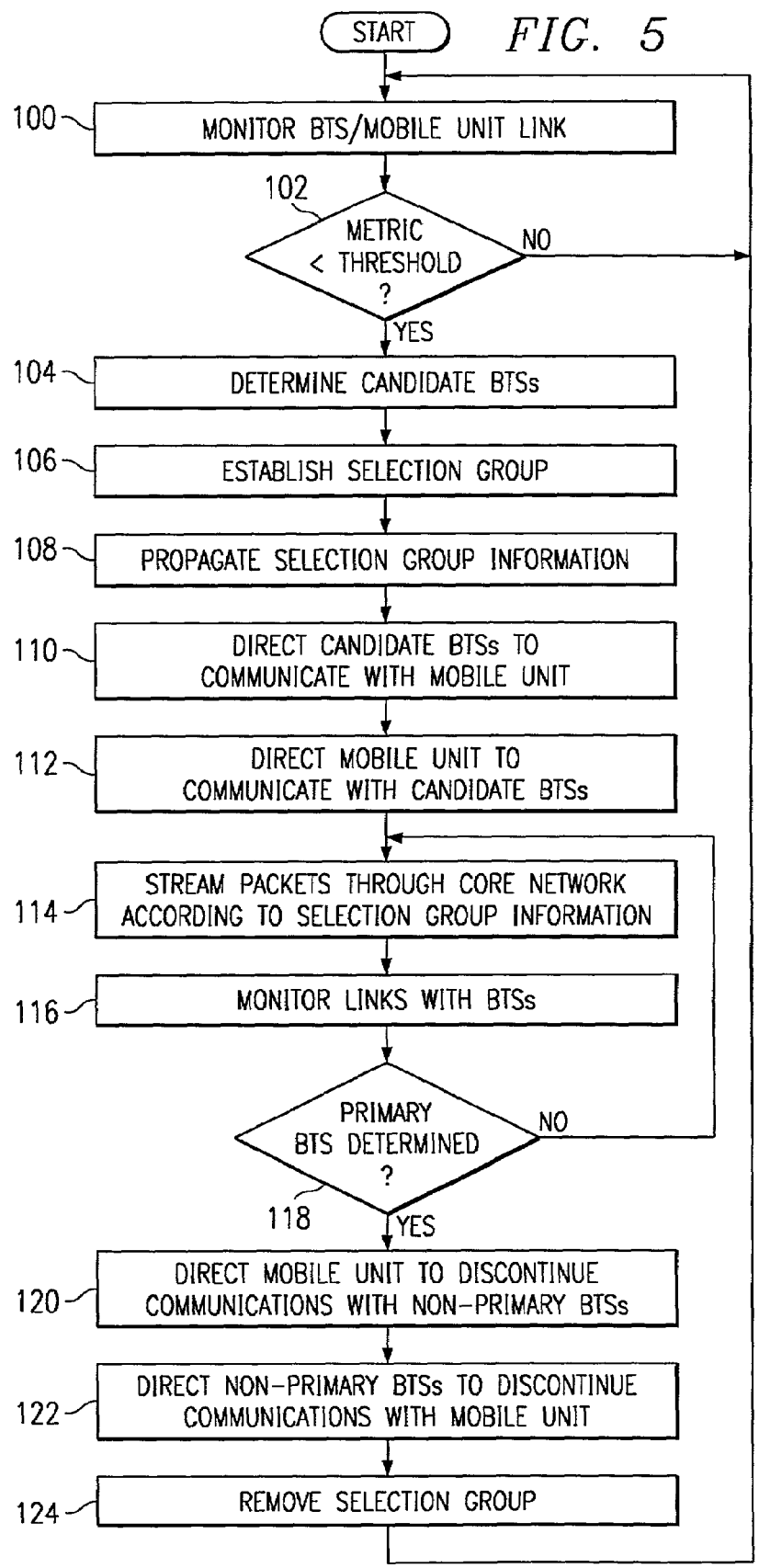
FIG. 5 illustrates an exemplary method for communicating packets using selection groups.

FIG. 5 illustrates an exemplary method for monitoring wireless links between mobile unit 12 and transceiver stations 18 and for establishing a selection group to facilitate roaming of mobile unit 12 between transceiver stations 18. Initially, mobile unit 12 establishes a communications session using a wireless link with transceiver station 18. Roam manager 24 monitors metrics for the wireless link between transceiver station 18 and mobile unit 12 at step 100. As previously discussed, roam manager 24 may monitor any suitable metrics for determining characteristics of the wireless communications link and may also access link table 30, or roam manager 24 may receive reports or requests from mobile unit 12 or transceiver stations 18 to initiate roaming. Roam manager 24 determines whether the metrics have fallen below a threshold at step 102. If not, roam manager 24 continues monitoring the link at step 100. However, if the metrics fall below a threshold, roam manager 24 initiates roaming of mobile unit 12 beginning at step 104.

As part of initiating roaming, roam manager 24 determines candidate transceiver stations 18 at step 104. As previously discussed, candidate transceiver stations 18 may, for example, include transceiver stations 18 in physical proximity to the current transceiver station 18 communicating with mobile unit 12. To determine candidate transceiver stations 18, roam manager 24 may access candidate table 28. However, system 10 contemplates roam manager 24 determining candidate transceiver stations 18 using any suitable equipment and/or methods, such as responsive to requests or commands from mobile unit 12 or transceiver stations 18. Roam manager 24 then establishes a selection group including the current transceiver station 18 communicating with mobile unit 12 and candidate transceiver stations 18 at step 106. This may include, for example, determining a metric for use in selecting between redundant packets received from multiple locations. Roam manager 24 propagates selection group information to elements in managed network 14 at step 108. This propagation establishes the hierarchical structure, as illustrated by hierarchy 40, for selecting between redundant packets received by multiple transceiver stations 18. By determining candidate transceiver stations 18, establishing a selection group, and propagating this selection group throughout managed network 14, roam manager 24 establishes a mechanism for receiving copies of packets from mobile unit 12 using multiple transceiver stations 18, streaming these packets through managed network 14, and selecting a single copy of each packet to forward to a remote destination.

Roam manager 24 may also direct the establishment of communications between transceiver stations 18 and mobile unit 12 at steps 110 and 112. At step 110, roam manager 24 directs candidate transceiver stations 18 to communicate with mobile unit 12, thus setting up multiple wireless links between managed network 14 and mobile unit 12. In addition, roam manager 24 directs mobile unit 12 to communicate with candidate transceiver stations 18 at step 112. Because transceiver stations 18 and mobile units 12 may support wireless communications using any suitable wireless communications protocol, roam manager 24 directs communications between transceiver stations 18 and mobile units 12 using the appropriate protocol or protocols.

For example, in a CDMA system, roam manager 24 may instruct transceiver stations 18 to transmit communications to mobile unit 12 using particular Walsh code/frequency combinations and to receive transmission from mobile unit 12 using a particular Walsh code/frequency combination. Similarly, roam manager 24 may instruct mobile unit 12 to receive transmissions using the various Walsh code/frequency combinations assigned to candidate transceiver stations 18. These steps permit mobile unit 12 to establish parallel wireless links with multiple transceiver stations 18 for the communication of packets associated with a communications session.

Accordingly, each transceiver station 18 in the established selection group may receive a copy of each inbound packet transmitted by mobile unit 12. These redundant packets stream through CPN 22 according to the established selection group at step 114. This may include hierarchically selecting between the redundant packets received by multiple transceiver stations 18. The discussion above with respect to hierarchy 40 illustrates exemplary operation of a particular embodiment for streaming packets according to selection group information. However, system 10 contemplates using any suitable techniques for selecting between redundant packets and copying packets to multiple transceiver stations 18.

While the selection group is operating, roam manager 24 monitors links with transceiver stations 18 in the selection group at step 116. Through this monitoring, roam manager 24 may determine whether a selected one of these transceiver stations 18 should be chosen from among the group as the primary transceiver station 18. As previously discussed, roam manager 24 may monitor any suitable metrics associated with wireless links between transceiver stations 18 and mobile unit 12. For example, each transceiver station 18 may continuously, periodically, or sporadically communicate a metric indicating some characteristic associated with wireless communications between that transceiver station 18 and mobile unit 12. Based on these and/or other metrics, roam manager 24 determines whether a selected one of transceiver stations 18 in the selection group should be chosen as a primary transceiver station 18 at step 118. If not, packets continue to stream according to the selection group, and roam manager 24 continues monitoring selection group transceiver stations 18.

However, if roam manager 24 determines a primary transceiver station 18, roam manager 24 may then terminate roaming and remove the selection group associated with mobile unit 12. To terminate roaming, roam manager 24 directs mobile unit 12 to discontinue communications with non-primary transceiver stations 18 at step 120. For example, roam manager 24 may instruct mobile unit 12 to discontinue receiving communications on the Walsh code/ frequency combinations assigned to the non-primary transceiver stations 18. Roam manager 24 may also direct the non-primary transceiver stations 18 to discontinue communications with mobile unit 12 at step 122. This may include, for example, roam manager 24 instructing these transceiver stations 18 to discontinue transmitting outbound packets to mobile unit 12 and to discontinue receiving inbound packets on the Walsh code/frequency combination assigned to mobile unit 12.

In addition, roam manager 24 removes the selection group associated with mobile unit 12 at step 124. To remove the selection group, roam manager 24 may propagate a command through managed network 14. For example, roam manager 24 may instruct elements of managed network 14 to discard selection group information and to discontinue selecting between packets from mobile unit 12 based on the selection group information. After removing the selection group and terminating roaming, roam manager 24 returns to monitoring the remaining wireless link between transceiver station 18 and mobile unit 12.

While this flowchart illustrates an exemplary method, system 10 contemplates using any suitable techniques and equipment for managing roaming of mobile unit 12. As previously discussed, this includes the distribution or centralization of decision making components. For example, many of the steps performed by roam manager 24 may be implemented by various components within system 10, such as transceiver stations 18, gateways 20, or other suitable equipment. In addition, while this flowchart illustrates the establishment of a static selection group, system 10 contemplates using soft roaming and dynamic selection groups as described above. Also, many of the steps in this flowchart may take place simultaneously and/or in different orders than as shown. Furthermore, system 10 contemplates using methods with additional steps, fewer steps, or different steps, so long as the methods remain appropriate for establishing selection groups to select between redundant packets received.

Figure 6:
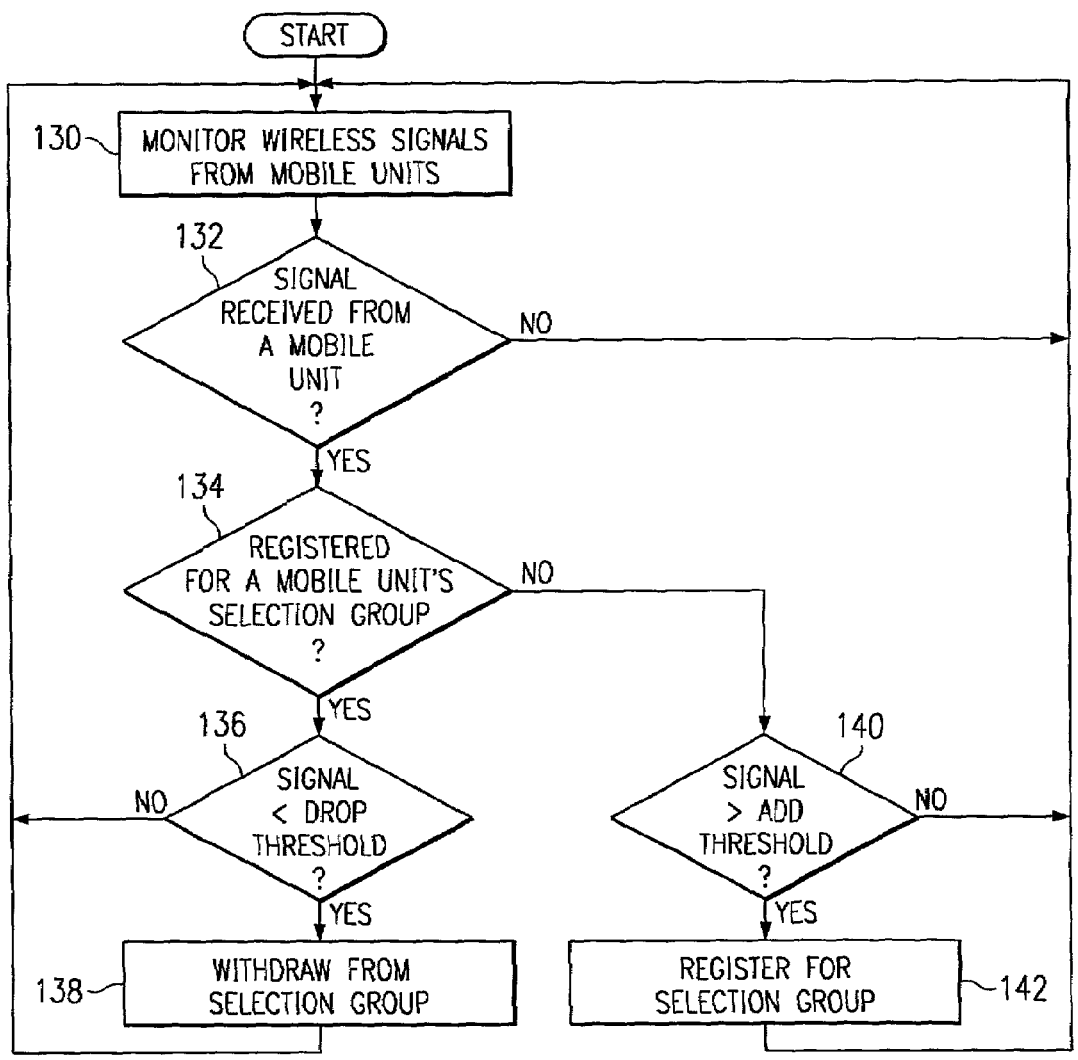
FIG. 6 illustrates an exemplary method for registering and withdrawing from selection groups associated with mobile units.

FIG. 6 illustrates an exemplary method for registering and withdrawing from selection groups associated with mobile units. For the description of this flowchart, transceiver station 18 performs each of the steps. However, system 10 contemplates any of the components of system 10, such as roam manager 24, performing some or all of the steps described.

Transceiver station 18 monitors wireless signals from mobile units 12 at step 130. This includes transceiver station 18 monitoring control channels, communications sessions, and/or other transmissions from mobile units 12. For example, transceiver station 18 may attempt to receive any signals from mobile units 12 that wireless interface 64 of transceiver station 18 detects. Transceiver station 18 determines whether any signals have been received at step 132 and, if not, continues monitoring signals at step 130. However, if a signal has been received from mobile unit 12, transceiver station 18 determines whether it is currently registered for the selection group for that mobile unit 12 at step 134.

If transceiver station 18 is registered for the selection group associated with mobile unit 12, transceiver station 18 determines whether to remain in the selection group. Thus transceiver station 18 determines whether the signal indicates that wireless communications have dropped below a drop threshold at step 136. To satisfy this determination, transceiver station 18 may delay until multiple signals below the drop threshold have been received or until signals have fallen below the drop threshold for a predetermined period of time. Alternatively, transceiver station 18 may determine whether it has ceased receiving any signals from mobile unit 12. However, if the signal (or signals) have not dropped below the drop threshold, transceiver station 18 resumes monitoring signals at step 130.

If the signal has dropped below the drop threshold, transceiver station 18 withdraws from the selection group associated with mobile unit 12 at step 138 and then resumes monitoring signals. After withdrawing from the selection group, transceiver station 18 ceases to participate as a link for communications sessions established by mobile unit 12. That is, for communications sessions established by mobile unit 12 with remote devices, transceiver station 18 will not forward inbound or outbound communications. For example, in a CDMA system, transceiver station 18 may discontinue receiving session communications from mobile unit 12 on a Walsh code/frequency combination associated with transmissions from mobile unit 12. Transceiver station 18 may also instruct mobile unit 12 to discontinue receiving communications from transceiver station 18 on a particular Walsh code/frequency combination.

If transceiver station 18 determines that it is not registered for the selection group associated with mobile unit 12 at step 134, transceiver station 18 determines whether to register as a member of the selection group. Thus transceiver station 18 determines whether the signal indicates that wireless communications have exceeded an add threshold at step 140. As with the drop threshold, transceiver station 18 may delay until multiple signals above the add threshold have been received or until signals have exceeded the add threshold for a predetermined period of time. If not, transceiver station 18 resumes monitoring signals at step 130.

However, if the signal (or signals) have exceeded the add threshold, transceiver station 18 registers for the selection group associated with mobile unit 12 at step 142 and then resumes monitoring signals at step 130. As a member of the selection group, transceiver station 18 participates as a link in communications sessions, such as telephone calls, established by mobile unit 12 with remote devices. For example, in a CDMA system, transceiver station 18 may begin receiving session communications from mobile unit 12 on a Walsh code/frequency combination associated with transmissions from mobile unit 12. Transceiver station 18 may also instruct mobile unit 12 to begin receiving communications from transceiver station 18 on a particular Walsh code/frequency combination.

While this flowchart illustrates an exemplary method, system 10 contemplates using any suitable techniques and equipment for managing membership, registration, and removal from selection groups associated with mobile units 12. For example, many of the steps in this flowchart may be performed by components other than transceiver station 18. Moreover, many of the steps in this flowchart may take place simultaneously and/or in different orders than as shown. In addition, system 10 contemplates using methods with additional steps, fewer steps, or different steps, so long as the methods remain appropriate for managing membership of, registration to, and removal from selection groups associated with mobile units 12.

FIG. 7 illustrates an exemplary method for an element in managed network 14 to participate in a selection group hierarchy. This exemplary description focuses on the operation of a particular router 42 in managed network 14; however, any other appropriate device may be used. Router 42 receives selection group information from roam manager 24 at step 150. This information may include data such as a mobile unit 12 associated with the selection group, transceiver stations 18 in the selection group, a metric or other appropriate technique to use in selecting between packets, or other suitable information. Based on this information and network topology information, router 42 may determine an appropriate position in a selection group hierarchy at step 152. For example, router 42 may determine a single network address for the next higher level in a hierarchy and multiple network addresses for the next lower level of the hierarchy. As routers 42 in managed network 14 perform these determinations, they may form a packet voting hierarchy similar to hierarchy 40 discussed above. Router 42 may then store the selection group information, including any network addresses, using any appropriate methods and devices at step 154.

Router 42 monitors communications from other components in system 10 at step 156. Router 42 determines whether an indication to remove the selection group has been received at step 158. If so, router 42 removes the selection group information and completes processing of this selection group. If the selection group has not been removed, router 42 determines whether a graded packet originating from mobile unit 12 has been received at step 162. Upon receiving a copy of an inbound packet in the form of a graded packet, router 42 may then access selection group information at step 164. In this step, router 42 may determine how many copies of the inbound packet should be received before selecting and forwarding one of the graded packets. Router 42 may access packet identifiers, such as a sequence numbers, to determine the group of packets from which to select. Thus, router 42 determines whether all copies of this inbound packet have been received at step 166. If not, router 42 determines whether to continue waiting for all expected graded packets at step 168.

If the timeout has not been reached and all of the graded packets have not been received, router 42 continues checking for graded packets at step 166. However, upon timing out or receiving all expected graded packets, router 42 selects one of the graded packets at step 170. This includes router 42 comparing metrics encoded in the graded packets or using any other suitable technique for selecting between the graded packets. If a timeout has occurred, router 42 may also generate an error message. Router 42 then forwards the selected packet to the component in the next level up in the selection group hierarchy at step 172 and then continues monitoring communications at step 156.

While this flowchart illustrates an exemplary method, system 10 contemplates using any suitable techniques and equipment for packet voting among redundant packets. Moreover, many of the steps in this flowchart may take place simultaneously and/or in different orders than as shown. In addition, system 10 contemplates using methods with additional steps, fewer steps, or different steps, so long as the methods remain appropriate for packet voting among redundant packets.

As described above, routers 42 or other appropriate devices are capable of selecting one or more redundant packets and forwarding the selected packets. In this case, the content of each selected packet is not modified before a router 42 forwards the packet. However, instead of forwarding selected packets without modification, routers 42 may combine different portions of two or more redundant packets from a single source to create one or more improved packets. As an example only, if two redundant packets are received, a router 42 may combine the first half (or any other portion) of the content of the first packet with a the second half (or any other portion) of the second packet. Therefore, if router 42 determines that the first half of the first packet is in error and determines that the second half of the second packet is in error, then router 42 may combine the halves of the packets that do not have errors to create am improved packet having no errors in its content. Router 42 may evaluate the content of each incoming packet on a bit-by-bit basis to determine which portions of the packet to include in an improved packet. For example, router 42 may evaluate the first bit of a first and a second packet and select one of the bits to include in the improved packet. Router 42 may then perform the same evaluation and selection on each successive bit of the first and second packets. Alternatively, router 42 may evaluate and select groups of bits or any other appropriate portions of the content of a packet.

A router 42 or other appropriate device may evaluate the bits or other portions of the content included in a packet using any appropriate technique. One such technique is to use forward error correction techniques to determine whether a bit is in error. If a bit from a first redundant packet is in error and the same bit in a second redundant packet is not in error, then router 42 may select the bit from the second packet. As described above, this evaluation may be performed on a bit-by-bit basis. Furthermore, any other appropriate evaluation technique may be use to select portions of a packet to include in an improved packet containing content from multiple packets received by a router 42.

Although the combination of content from two redundant packets to form one improved packet is described above, the present invention also contemplates that content or other information from any appropriate number of redundant packets may be combined to create any appropriate number of improved packets. For example, a portion of the content from a first packet and a second packet which are redundant may be combined to create one improved packet and a portion of the content from the second packet and a third packet (which is also redundant) may be combined to create another improved packet. The determination of which portions of which packets are combined may be made using any appropriate technique. Router 42 may evaluate the content of all incoming redundant packets to determine which portions of which redundant packets to combine. Alternatively, router 42 may first select two or more of the redundant packets using an appropriate selection technique and then evaluate and combine, if appropriate, the content of the two or more of the selected packets.

The capability of routers 42 or other appropriate devices in a selection group to combine multiple redundant packets is advantageous since two or more packets that contain errors may be combined to create an improved packet that contains no errors or fewer errors. In addition, this capability may be used to improve error correction of the packets communicated from a mobile unit 12 or other device. More specifically, through the combination of information in multiple redundant packets, different error correction codes associated with each redundant packet may be concatenated to produce an improved error code.

FIG. 8 illustrates exemplary functional components of a communication system 200 using forward error correction. Forward error correction (FEC) techniques are used to correct errors introduced during communication of content from mobile units 12. FEC techniques use an encoder 204 to add redundant information, referred to as channel coding, to the content being communicated from a source 202 over a communication channel 206 (for example, the wireless communication channels used by mobile units 12). This channel coding maps a sequence of bits or other information received from source 202 into a sequence of code bits that enable errors introduced during transmission of a sequence of bits or other information to be corrected. A modulator 205 is used to modulate the code bits into a signal for transmission over communication channel 206.

A demodulator 207 receives and demodulates the signal to produce a sequence of code bits. A decoder 208 receives the code bits and attempts to correct any errors by replacing the received sequence of code bits (which include one or more errors) with a sequence of code bits that decoder 208 determines were most likely transmitted by encoder 204. The mapping performed at encoder 204 is then inverted to hopefully produce the sequence of bits originally communicated from source 202. Decoder 208 communicates this sequence of bits to the intended destination 210.

Encoder 204, modulator 205, demodulator 207, and decoder 208 may be implemented using any appropriate combination of hardware and/or software at one or more locations. Furthermore, it should be noted that although source 202, encoder 204, and modulator 205 are illustrated as separate components, two or more of these components may be co-located and/or integrated. As an example only, source 202, encoder 204, and modulator 205 may be co-located in a mobile unit 12. Similarly, two or more of demodulator 207, decoder 208, and destination 210 may be co-located and/or integrated. As examples only, demodulator 207 and decoder 208 may be co-located at a transceiver station 18 or demodulator 207 may be located at a transceiver station 18 and decoder 208 may be located at a router 42.

The two major types of channel coding are block codes and convolutional codes. When using block codes, encoder 204 splits up an incoming stream of bits or symbols from source 202 into blocks of k digits and adds redundancy (extra bits) to the block according to a pre-defined algorithm. The output of encoder 204 in this case is a "code word" including n bits, where n>k. The "code rate" for such a block code may be defined as k/n. For example, a code rate of 1/3 indicates that the code word is three times as long as the received bits and thus there are two code bits for every received bit. Unlike block codes, convolutional codes may be thought of as mapping a continuous stream of bits (one or more bits at a time) instead of mapping separate blocks of bits. Thus, convolutional codes map a stream of k bits per second into a stream of n bits per second. Convolutional codes may be described as having a "memory" since the mapping of information bits (representing content from mobile unit 12) to code bits is a function of past information bits (unlike block codes).

One type of convolutional code that may be used in conjunction with the present invention are punctured codes. Punctured codes are similar to typical convolutional codes except for the fact that bits from a generated code word are strategically removed (the code word is "punctured") to reduce the length of the code word and thus reduce the required bandwidth. However, this also increases the code rate and thus produces less effective error correction. Therefore, there is typically a balancing performed between the number of "punctures" or removed bits in a code word and the allocated bandwidth. One advantage of punctured codes is that two or more code words may be strategically punctured in different places such that there is a orthogonal relationship between the different code words. Therefore, an decoder 208 may combine information obtained from each of the code words to decode all of the code words. In other words, each code gives a unique insight into the error.

When using either block codes or convolutional codes, as the number of code bits that are added to information bits is increased (and thus as the code rate decreases), the probability of accurately correcting transmission errors in the information bits increases. However, a decrease in the code rate requires additional bandwidth in communication channel 206 decreasing the code rate requires increasing the number of bits that are communicated. It is often not possible or feasible to increase the bandwidth of communication channel 206. On the other hand, error rates resulting from high code rates may also not be acceptable.

The above problems may be solved, at least in part, through the concatenation of error correction codes associated with redundant packet streams from a mobile unit 12. In such an embodiment, complimentary code words may be generated for each packet stream such that the code words from two or more of the packet streams may be combined to create a code word having an effective code rate that is less than the code rate of either individual packet stream. As an example only, a code word in a first redundant packet with an associated code rate of 2/3 may be combined with a code word in a second redundant packet also having an associated code rate of 2/3 to create a packet having a code word with an associated code rate of 1/3.

FIG. 9 illustrates an exemplary method of error correction using concatenated error codes from redundant packet streams. The exemplary method begins at step 250 where a selection group is formed for a mobile unit 12, as described above. At step 252, mobile unit 12 generates coded redundant content for each transceiver station 18 in the selection group. Each set of redundant content (the content generated for each transceiver station 18) is coded using a punctured code or other appropriate code that is orthogonally related to the code used for the other sets of redundant content. Therefore, the codes used to encode the redundant sets of content are related and may be used together to decode the different sets of redundant content when received by transceiver stations 18. The multiple transceiver stations 18 receive the coded content from mobile unit 12 at step 254. At step 256, each transceiver station 18 generates a graded packet including the coded content and the value of an appropriate metric, as described above. However, such grading of the received coded content may not be performed in particular embodiments. In such cases, a packet is generated that includes the coded content but not the metric value.

The packet including the coded content is communicated to an appropriate decoder 208 at step 258. This decoder 208 may be included in or associated with a router 42 in the selection group or any other appropriate network device. At step 260, decoder 208 receives two or more packets including redundant coded content from two or more transceiver stations 18. At step 262, decoder 208 concatenates the two or more orthogonally related codes associated with the redundant packets and then uses the concatenated code (the cross product of the codes) to decode the content and generate two or more redundant packets including the decoded content. One of the redundant packets is then selected at step 264 using any appropriate technique and communicated to the destination. This selection may be performed by a router 42 associated with decoder 208 or the multiple redundant packets may be communicated to a router 42 after decoding.

The decoded content in the two or more packets may be different due to different transmission errors in the various communication channels 206 over which the content was communicated from mobile unit 12. However, the use of the concatenated code may produce two redundant packets with identical decoded content. The orthogonal related codes may be concatenated using any appropriate technique known in the art. For example, the multiple orthogonal codes may be generated such that the punctures in each code may be filled by another code (there are no common punctures between the codes). Therefore, the multiple codes may be combined to create a code with no punctures. Alternatively, the codes may be concatenated using more advanced techniques such as the use of serially concatenated convolutional codes (SCCC), parallel concatenated convolutional codes (PCCC), or any other appropriate techniques.

While this flowchart illustrates an exemplary method, system 10 contemplates using any suitable techniques and equipment for error correction using concatenated error codes from redundant packet streams. Moreover, many of the steps in this flowchart may take place simultaneously and/or in different orders than as shown. In addition, system 10 contemplates using methods with additional steps, fewer steps, or different steps, so long as the methods remain appropriate for packet voting among redundant packets.

In addition to or instead of error code concatenation, embodiments of the present invention may leverage the existence of multiple redundant packet streams to improve the decoding performed at decoder 208. In an exemplary embodiment, decoder 208 is a Viterbi or trellis decoder. Viterbi decoders are one type of decoder 208 that may be used in conjunction with convolutional codes. In simplified terms, an exemplary Viterbi decoder operates as follows. For each set of two code bits (which may be referred to as a "symbol") that are received, a Viterbi decoder computes a set of probabilities for each possible encoder state that could have produced that symbol. The possible states are each represented by a "branch". As a number of consecutive symbols are received, the branches associated with each symbol form a tree-like structure or trellis (the branches are related and connected since convolutional coding for each symbol is based on previous symbols). Each branch has an associated probability and thus a state "path" through the trellis that includes multiple connected branches also has an associated probability. To decode a set of symbols, a Viterbi decoder determines the most probable path through the trellis (the path that leads to the most probable state) and then retraces the path to determine the values of the symbols. This decoding function and operation of a Viterbi decoder is well known in the art and will not be described in further detail.

The exemplary Viterbi decoder 208 described above as well as other types of decoders 208 may be hard decision decoders or a soft decision decoders. Hard decision decoding refers to the situation where demodulator 207 translates the received signal from communication channel 206 into a sequence of bits corresponding to the transmitted bit stream (for example, a single bit having a value of zero or one is generated for each "bit" represented in the modulated signal). Then, using the example above, consecutive bits are decoded in pairs using decoder 208. The disadvantage of hard decision decoding is that additional error may be introduced during demodulation since demodulator 207 assigns each bit a value of one or zero even if the received signal does not clearly indicate which value should be assigned. For example, if a signal with an amplitude of one volt represents a bit value of one and a signal with an amplitude of zero volts represents a bit value of zero, demodulator 207 may determine that a received signal having an amplitude of 0.7 volts should represent a bit value of one (since 0.7 is closer to one than zero). However, this hard decision may be incorrect if the signal originally had a value of approximately zero volts and was altered due to transmission errors. Furthermore, this error will be promulgated by decoder 208 since decoder 208 will not know the true value of the signal that was received and thus cannot account for it.

In soft decision decoding, demodulator 207 communicates the actual received value associated with a bit (or a near representation of the value) to decoder 208 so that decoder 208 may more accurately decode the received bit stream. As an example only, demodulator may assign each incoming bit a number between "0" and "255" (represented using eight bits). These assigned bits may be referred to as "soft bits." An ideal zero bit (a signal exactly representing a zero value) is assigned the soft bit value "0" and an ideal one bit is assigned the soft bit value "255." Values between "0" and "255" are assigned to incoming bits having values between zero and one (according to the incoming signal). This provides two hundred fifty-six quantization levels that decoder 208 may use to determine whether a zero or a one has been transmitted for each value.

For example, using the above example, if a signal having an amplitude of one volt is received, it may be assigned the soft bit value "255." If a signal having an amplitude of zero volts is received, it may be assigned the soft bit value "0." If a signal having an amplitude of 0.7 volts is received, it may be assigned the soft bit value "178" (this value is seven tenths of 255, but any other appropriate value may be used). Since each incoming bit is represented by an eight-bit value (or any other appropriate number of bits) instead of a single bit, the design and operation of decoder 208 is somewhat more complex than when each bit is represented by a single hard bit (zero or one). However, since the soft bits that demodulator 207 provides to decoder 208 more accurately represent the corresponding received code bit, decoder 208 may more accurately decode the received code bits. The design of a decoder 208, such as a Viterbi decoder 208, for processing soft bit input from a demodulator 207 is well known in the art and will not be described in further detail.

Among its advantages, the use of soft decision decoding allows demodulator 207, decoder 208, or any other appropriate component to further refine the generated soft bits by modeling the noise or other error sources in channel 206 and correcting the soft bits to account for the error created by this noise using noise correction algorithms. One method of correcting for this noise is to communicate a known pilot signal to decoder 208 or another appropriate component. For example, source 202 or encoder 204 may attach a pilot signal to data to be communicated (for example, at the beginning of the data) or may send the pilot signal separately from other information communicated from source 202. The contents (bit values) of the pilot signal are known to decoder 208. Decoder 208 receives the pilot signal from demodulator 207 and decodes the pilot signal in the same manner that decoder 208 decodes other received information. Decoder 208 then compares the decoded pilot signal to the known value of the pilot signal. If the two signals are different, then decoder 208 can determine where errors have occurred (due to distortion caused by noise or other error sources in channel 206) and can adjust the decoding process to correct these errors in subsequent information received by decoder 208. This process may be repeated as often as necessary to correct for changing error sources in channel 206.

FIG. 10 illustrates an exemplary method for improved error correction using redundant packet selection information. In a similar manner that pilot signals are used to adjust the operation of a decoder 208 or other appropriate component, packet selection information in managed network 14 may also be used to adjust and improve the operation of decoder 208 or other appropriate components. However, instead of or in addition to the pilot signal being provided as the "known value," the content of the packet ultimately selected by routers 42 serves as the known value. The exemplary method begins at step 300 where a selection group is formed for a mobile unit 12, as described above. At step 302, the transceiver stations 18 included in the selection group each receive coded content (which may be data, voice, video, or any other type of information in coded form) from mobile unit 12. Each transceiver station 18 typically includes a demodulator 207 that receives the modulated coded content from a wireless communication channel 206 coupling the transceiver station 18 and mobile unit 12, demodulates the coded content (for example, into soft bits), and communicates the coded content to a decoder 208. The coded content received at each transceiver station 18 may be different since different errors may have been introduced in the coded content in the different communication channels 206 coupling mobile unit 12 and base transceiver stations 18.

Decoder 208, which may or may not be associated with a transceiver station 18, receives the coded content and decodes the content at step 304 using any appropriate decoding method. As described above, decoder 208 may use a pilot signal to improve the decoding process. The decoded content is then communicated in a packet to one or more routers 42 in the selection group. Again, the decoded content from each transceiver station 18 may be different since the coded content received at each transceiver station 18 may have been different. In addition to the decoded content, each packet may also include a value for a metric, such as BER, SNR, or any other appropriate metric. This value may be associated with the content after the content is decoded or at any other appropriate time. At step 306, the router or routers 42 receive multiple redundant packets, each including the decoded content (or variations thereof), and select one of the packets using any appropriate selection technique. For example, routers 42 may select the packet based on the metric value, based on a comparison of the relative content in each of the redundant packets, based on a comparison of the content in each of the redundant packets with an expected content, and/or any other appropriate selection technique.

At step 308, selection information identifying the packet that was selected is communicated to the decoders 208 associated with the selection group. This selection information may include the packet ID of the selected packet, the actual decoded content included in the selected packet, or any other appropriate information enabling decoders 208 to determine what decoded content was selected and how that selected content corresponds to the decoded content that was communicated from each decoder 208. As an example only, a decoder 208 may receive the ID of the selected packet then use that ID to determine a corresponding redundant packet that was sent from that particular decoder 208 (or determine that the selected packet is the same redundant packet communicated from that particular decoder 208). At step 310, each decoder 208 determines, based on the selection information, the decoded content that was selected by routers 42 and the decoded content that was communicated from the decoder 208.

Each decoder 208 determines at step 312 whether the content communicated from the decoder 208 is different than the selected content (since the selected content will typically be the same as the content communicated from at least one of the decoders). However, it should be noted that if the content from multiple redundant packets is combined to form an improved packet, the selected content may be different than the content communicated by all decoders 208. If the selected and communicated contents associated with a decoder 208 are the same (or substantially the same), the method ends for that decoder 208. If the selected and communicated contents are different, the method proceeds to step 314 for that decoder 208. At step 314, each decoder 208 evaluates the differences between the selected content and the content communicated from the decoder 208. This evaluation may include an analysis similar to the analysis decoder 208 may perform when using pilot codes, as described above. For example, decoder 208 may identify the differences, if any, between the selected content and the communicated content and determine how to correct the communicated content to remove the differences. At step 316, each decoder 208 adjusts its decoding process, if appropriate, to compensate for the differences in the contents and the method ends. The method may be repeated for each packet or other appropriate set of content that is received from mobile unit 12, decoded by decoders 208, and communicated to routers 42. Therefore, adjustments made as described above in step 316 may be used in decoding subsequent content and the decoding process may be continuously adjusted as new selection information is communicated to decoders 208.

Although the present invention has been described in several embodiments, numerous changes and modifications may be suggested to one skilled in the art, and it is intended that the present invention encompass such changes and modifications as fall within the scope of the present appended claims.

What is claimed is:

1. A communications system, comprising:
   a mobile unit operable to transmit redundant content to a plurality of base transceiver stations, a copy of the content transmitted to each base transceiver station being encoded using a code that is related to the codes used to encode copies of the content transmitted to the other base transceiver stations;
   a plurality of base transceiver stations, each base transceiver station operable to:
   receive a copy of the coded content from the mobile unit;
   generate a packet including the coded content; and
   communicate the packet; and
   a decoder operable to:
   receive a plurality of packets each including a copy of the coded content, each packet generated at a different base transceiver station;
   decode the content in the packets by concatenating the related codes used to encode each copy of the content; and
   generate one or more redundant packets including the decoded content.

2. The system of claim 1, further comprising a router operable to:
   receive a plurality of redundant packets from the decoder; and
   select one of the redundant packets using a packet selection technique.

3. The system of claim 2, wherein:
   each base transceiver station is further operable to:
   determine a value for a metric associated with communications between the mobile unit and the base transceiver station; and
   generate a packet including the value and the coded content;

the decoder is operable to generate one or more redundant packets including the value and the decoded content; and the router is operable to select of one of the redundant packets based on the value included in each packet.

4. The system of claim 1, wherein the related codes used to encode the copies of the content are orthogonally related.

5. The system of claim 1, wherein the related codes used to encode the copies of the content are punctured codes.

6. The system of claim 1, wherein the related codes are serially concatenated.

7. The system of claim 1, wherein the related codes are concatenated in parallel.

8. The system of claim 1, wherein the mobile unit is further operable to transmit each copy of coded content in a packet.

9. The system of claim 1, wherein the content comprises voice information received from a user of the mobile unit.

10. A network device comprising:
an interface operable to receive a plurality of redundant packets each generated at a different base transceiver station and each including a copy of coded content originating from a mobile unit, the coded content in each packet encoded using a code that is related to the codes used to encode the copies of the content in the other packets; and
a processor operable to:
decode the content in the packets by concatenating the related codes used to encode each copy of the content; and
generate one or more redundant packets including the decoded content.

11. The network device of claim 10, wherein the processor is further operable to select one of a plurality of redundant packets including the decoded content using a packet selection technique.

12. The network device of claim 11, wherein the processor is further operable to select of one of the redundant packets based on a value of a metric included in each packet, the value of the metric in each packet associated with communications between the mobile unit and the base transceiver station that received the copy of the content included in the packet from the mobile station.

13. The network device of claim 10, wherein the related codes used to encode the copies of the content are orthogonally related.

14. The network device of claim 10, wherein the related codes used to encode the copies of the content are punctured codes.

15. The network device of claim 10, wherein the related codes are serially concatenated.

16. The network device of claim 10, wherein the related codes are concatenated in parallel.

17. The network device of claim 10, wherein the content comprises voice information received from a user of the mobile unit.

18. A method for error correction using redundant packets, comprising:
receiving a plurality of redundant packets each generated at a different base transceiver station and each including a copy of coded content originating from a mobile unit, the coded content in each packet encoded using a code that is related to the codes used to encode the copies of the content in the other packets;
decoding the content in the packets by concatenating the related codes used to encode each copy of the content; and
generating one or more redundant packets including the decoded content.

19. The method of claim 18, further comprising selecting one of a plurality of redundant packets including the decoded content using a packet selection technique.

20. The method of claim 19, wherein selecting one of the redundant packets comprises selecting a redundant packet based on a value of a metric included in each packet, the value of the metric in each packet associated with communications between the mobile unit and the base transceiver station that received the copy of the content included in the packet from the mobile station.

21. The method of claim 18, wherein the related codes used to encode the copies of the content are orthogonally related.

22. The method of claim 18, wherein the related codes used to encode the copies of the content are punctured codes.

23. The method of claim 18, wherein the related codes are serially concatenated.

24. The method of claim 18, wherein the related codes are concatenated in parallel.

25. The method of claim 18, wherein the content comprises voice information received from a user of the mobile unit.

26. A method for error correction using redundant packets, comprising:
transmitting redundant content to a plurality of base transceiver stations from a mobile unit, a copy of the content transmitted to each base transceiver station being encoded using a code that is related to the codes used to encode copies of the content transmitted to the other base transceiver stations;
receiving a copy of the coded content from the mobile unit at each of a plurality of base transceiver stations;
generating a packet including the coded content at each base transceiver stations;
communicating the packets to a decoder;
decoding the content in the packets by concatenating the related codes used to encode each copy of the content; and
generating one or more redundant packets including the decoded content.

27. The method of claim 26, further comprising selecting one of a plurality of redundant packets including the decoded content using a packet selection technique.

28. The method of claim 27, wherein selecting one of the redundant packets comprises selecting a redundant packet based on a value for a metric included in each packet, the value of the metric associated with communications between the mobile unit and the base transceiver station.

29. Error correction software embodied in a computer-readable medium and operable, when executed on a computer, to:
receive a plurality of redundant packets each generated at a different base transceiver station and each including a copy of coded content originating from a mobile unit, the coded content in each packet encoded using a code that is related to the codes used to encode the copies of the content in the other packets;
decode the content in the packets by concatenating the related codes used to encode each copy of the content; and
generate one or more redundant packets including the decoded content.

30. The software of claim 29, further operable to select one of a plurality of redundant packets including the decoded content using a packet selection technique.

31. The software of claim 30, wherein selecting one of the redundant packets comprises selecting a redundant packet based on a value of a metric included in each packet, the value of the metric in each packet associated with communications between the mobile unit and the base transceiver station that received the copy of the content included in the packet from the mobile station.

32. A system for error correction using redundant packets, comprising:

means for receiving a plurality of redundant packets each generated at a different base transceiver station and each including a copy of coded content originating from a mobile unit, the coded content in each packet encoded using a code that is related to the codes used to encode the copies of the content in the other packets;

means for decoding the content in the packets by concatenating the related codes used to encode each copy of the content; and means for generating one or more redundant packets including the decoded content.

33. The system of claim 32, further comprising means for selecting one of a plurality of redundant packets including the decoded content using a packet selection technique.

34. The system of claim 33, wherein the means for selecting is operable to select a redundant packet based on a value of a metric included in each packet, the value of the metric in each packet associated with communications between the mobile unit and the base transceiver station that received the copy of the content included in the packet from the mobile station.

* * * * *